United States Patent

[11] 3,552,512

[72] Inventors Manfred Kammerer;
 Hans Schick, Ebingen, Germany
[21] Appl. No. 804,121
[22] Filed Mar. 4, 1969
[45] Patented Jan. 5, 1971
[73] Assignee August Sauter KG
 Ebingen, Germany
 a partnership
[32] Priority Mar. 20, 1968
[33] Germany
[31] No. 1,774,008

[54] AUTOMATIC PRICE CALCULATION SCALE
17 Claims, 7 Drawing Figs.

[52] U.S. Cl. .................................. 177/25,
 177/220
[51] Int. Cl. ............................................ G01g 23/22
[50] Field of Search .......................................... 177/25, 26,
 31, 32, 216, 220, 224; 235/58P.S., 61P.S.

[56] References Cited
UNITED STATES PATENTS

| | | | |
|---|---|---|---|
| 450,002 | 4/1891 | Conen | 177/25 |
| 914,764 | 3/1909 | Unger | 177/26X |
| 2,165,275 | 7/1939 | Kimball | 177/25 |
| 2,445,022 | 7/1948 | Colman | 177/25UX |
| 2,737,382 | 3/1956 | VanDuyn | 235/61P.S. |
| 3,129,879 | 4/1964 | Kuhnle et al. | 177/25X |

FOREIGN PATENTS

| | | | |
|---|---|---|---|
| 625,862 | 1/1936 | Germany | 177/220 |
| 1,033,435 | 7/1958 | Germany | 177/224 |
| 599,774 | 11/1959 | Italy | 177/220 |

*Primary Examiner*—Richard B. Wilkinson
*Assistant Examiner*—George H. Miller, Jr.
*Attorney*—Jacobi, Davidson & Kleeman ABSTRACT: An automatic price calculation scale is disclosed, the scale including an inclination pendulum which is deflectable through an angle about a rotational axis in dependence on the weight to be measured. An elongated guide means is attached to the pendulum means and extends in a direction generally outwardly from the rotational axis thereof. Slide means are displaceably mounted in the guide means at an adjustable distance from the rotational axis of the pendulum means and a displaceable horizontally extending member is pivotally connected to the slide means and is mounted on a carriage means which is vertically displaceable. Angular deflection of the pendulum means brings about a horizontal movement of the horizontally extending member, the extent of the horizontal movement being indicative of and read as the total price of the object being weighed and further being a function of the angular deflection of the pendulum and the distance that the slide means is mounted from the rotational axis of the pendulum means determined by the vertical displacement of the carriage means. The vertical displacement of the carriage means is automatically undertaken in response to a base price scale for the object set on an electrical keyboard switching means.

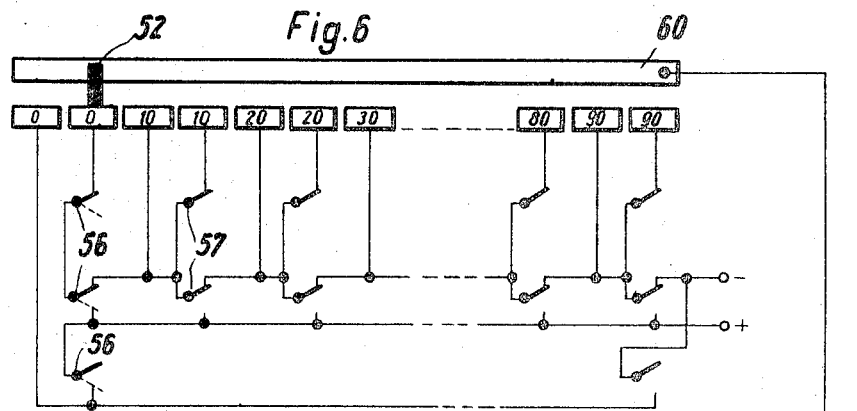
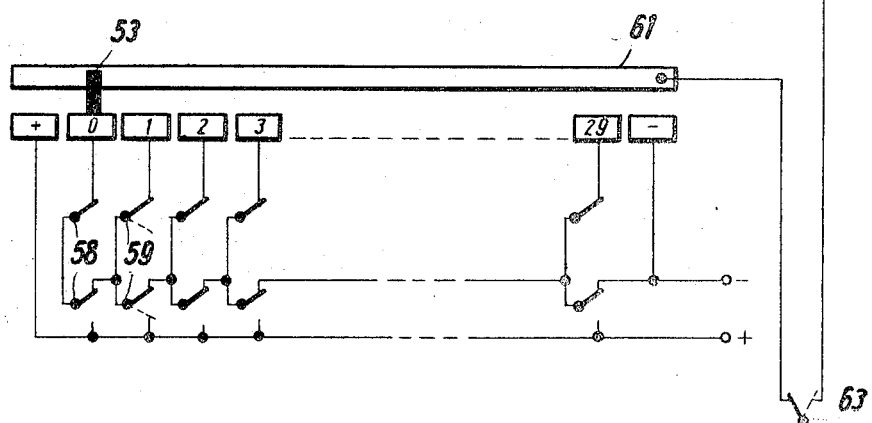
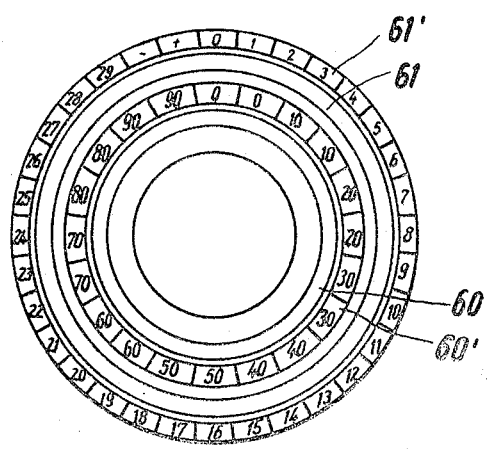
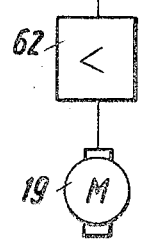
Fig. 6
Fig. 5

AUTOMATIC PRICE CALCULATION SCALE

BACKGROUND OF THE INVENTION

The instant invention generally relates to scales and particularly concerns a scale of the type which automatically calculates the price of the object being weighed.

Such automatic price calculation scales generally include an inclination pendulum means which is deflectable through an angle about a rotational axis in dependence on the weight of the item being sold. The amount of angular deflection can be directly read on the weight scale and is indicative of the weight of the object. A sliding means is associated with the inclination pendulum and is mounted thereto at a predetermined distance from the rotational axis of the pendulum. The connection between the slider or sliding means and the inclination pendulum comprises a lever arm of a length adjustable in accordance with the basic price, that is the price per unit weight, of the item being sold. A displaceable horizontally extending member is hingedly or pivotally connected to the slide means and is supported in a carriage means which is itself adjustable in a vertical direction in accordance with the basic selling price of the item. Adjustment of the carriage means serves to adjust the length of the lever arm between the inclination pendulum and the slide means and such adjustment has taken place in the art manually by means of a cable arrangement. Adjustment of the carriage means in this fashion results in a cumbersome mode of operation. Additionally, adjustment of the carriage means in an accurate fashion is very difficult to achieve and thus, the entire carriage adjustment process in the prior art is relatively time consuming.

SUMMARY OF THE INVENTION

Thus, there remains a need in this art for the provision of an automatic price calculation scale of the type described wherein adjustment of the carriage means to thus reflect the basic price for unit weight of the object to be sold can be achieved quickly and in a simple fashion. It is the primary object of the instant invention to satisfy this need.

To achieve this object, the instant invention contemplates, as an important feature thereof, the provision of a spindle drive means for vertically displacing the carriage means of the scale and thus setting a new basic price. The spindle drive means itself is contemplated to comprise a spindle which is vertically mounted and which is rotatable by means of a motor which selectively runs in the clockwise or counterclockwise direction to raise or lower the carriage means. Importantly, the adjustment of the height of the carriage means takes place automatically in a substantial timesaving manner as contrasted with the prior art techniques of purely manual adjustment since adjustment, under the inventive concepts disclosed herein, takes place merely by switching the motor means into an operative condition so as to run either in the clockwise or counterclockwise direction.

In accordance with yet a further feature of the instant invention, a friction drive means is provided between the motor means and the spindle means, the friction drive means comprising a driving wheel operatively associated with the motor and a driven wheel associated with the spindle. The friction drive means is such that it is possible to disengage the drive wheel from the driven wheel when the motor is switched off thus quickly stopping the spindle and eliminating possible positional errors due to the existing rotational momentum of the motor.

When the spindle is stopped, the height of the carriage means corresponds to that associated with the given set basic price. In order to allow the spindle to correspond to a full monetary unit amount when it is stopped, a notched wheel is associated with the spindle into the notches of which a pawl of a pawl lever engages. The pawl lever itself can be disassociated from the notched wheel by means of an electromagnet which is energized as long as the motor means is under current and thus running to turn the spindle and adjust the height of the carriage means. While the spindle is being driven by the motor means, the notched wheel and pawl mechanism are inoperative such that the motor does not have to overcome any additional frictional force that may be associated with the action of the pawl and ratchet mechanism for fixing the stopped position of the spindle. In addition to automatic adjustment of the carriage height by means of the motor means, the instant invention further contemplates the provision of a manually operable flywheel drive which is utilized instead of the motor drive, the manually operable flywheel drive being selectively rotatable either in the clockwise or the counterclockwise direction. According to the invention, this manual operation can also be utilized as a precision or fine adjustment of the carriage height which is performed after the rough or coarse adjustment brought about by operation of the motor means.

The instant invention further contemplates the provision of a digital indicator means associated with the spindle which indicates the set basic unit price of the item to be weighed and sold. Additionally, the instant invention contemplates the provision of a sliding indicator and a coarse scale directly associated with the carriage means which serves to indicate in a direct fashion the vertical displacement of the carriage means and thus the set unit price.

In order to prevent overshooting of the spindle when utilizing the motor means, the instant invention contemplates the provision of stationary limit switches associated with the carriage means provided at the end limits of travel of the carriage means. These stationary limit switches when operated by the carriage means, when the carriage means approaches its terminal position, serve to switch off the motor means and thus stop the spindle. Additionally, a rocker switch means is suitably provided for switching the motor on and off, this rocker switch means additionally operating the friction drive means and the electromagnet for the pawl lever of the ratchet and pawl arrangement.

In accordance with the instant invention, the carriage adjustment process is further substantially speeded up over that of the prior art and additionally made far easier by providing a keyboard switch means which is operatively associated with both the motor means and the electromagnets for the friction drive means and the ratchet and pawl mechanism. The keyboard switch means itself comprises a plurality of keys which can be set to correspond to the desired basic unit price of the item. In an automatic fashion, once the basic unit price has been set on the keyboard switch means, the carriage means will assume the proper displacement corresponding to such set unit price.

In accordance with a particularly suitable embodiment of the instant invention as will be discussed in more detail hereinbelow, an electrical contact disc is provided on a control shaft also driven by the electric motor means, the contact disc incorporating a closed contact ring which is associated with an additional ring of lamellae or conductive strips which are selectively connected with the contact ring by a stationary slider. Respective ones of the lamellae can be electrically neutralized, the other lamellae being electrically energized, by depressing various keys of the keyboard switch means. In this fashion, current is cut off to the motor means when the motor means and its control shaft is in a position corresponding to a neutralized lamella. The basic unit price of the item to be weighed and sold is normally determined by two monetary units such as, for example, the mark and the pfennig in the German monetary system, although other monetary values can be used as desired. Accordingly, an additional feature of the instant invention contemplates the provision of a second contact ring and a second ring of associated lamella on the contact disc. Both contact rings and associated lamellae can be switched successively through an alternating switch means such that the larger monetary unit can first be set and then the smaller monetary unit can be subsequently set. One of the lamellae rings on the contact disc is thus associated with the German pfennig or small monetary unit whereas the other rings of lamellae are associated with the German mark units.

Conceptually, these two monetary units may be thought of as "cents" and "dollars," respectively.

Although the instant invention has been briefly described above as incorporating a stationary slider means and a rotatable contact disc it should be appreciated that the slider means can themselves be mounted on the control shaft so as to be displaceable whereas the contact disc could be stationarily mounted.

BRIEF DESCRIPTION OF THE DRAWINGS

The invention itself will be better understood and further advantageous features and objects thereof will become apparent when attention is given the following detailed description of preferred embodiments, such description referring to the appended drawings wherein:

FIG. 5 is a schematic illustration of a contact disc utilized in the motor control means of the instant invention;

FIG. 6 is a schematic circuit diagram of the keyboard switch means; and

DETAILED DESCRIPTION OF PREFERRED INVENTIVE EMBODIMENTS

Figure 1:
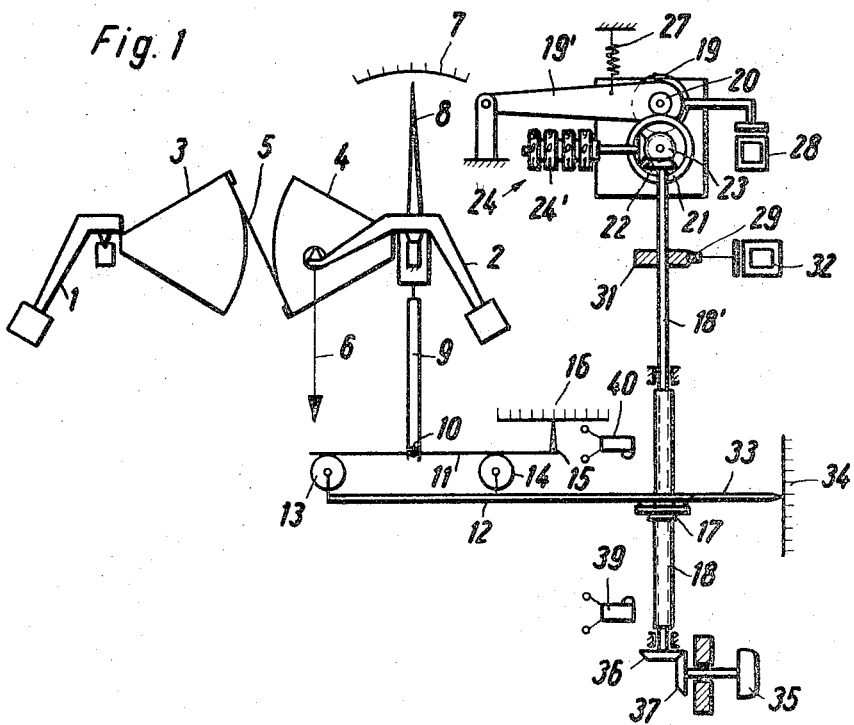
FIG. 1 is a schematic illustration of the essential elements of the inventive scale.
Figure 2:
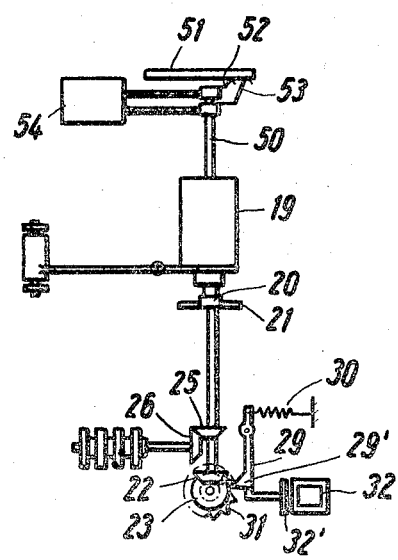
FIG. 2 is a schematic plan view of portions of the inventive scale of FIG. 1 related to the drive mechanism.

Referring now to FIGS. 1 and 2, two inclination pendulums 1 and 2 are supported on knife edges in a nonillustrated housing and are coupled together via cam discs or segments 3 and 4 and band 5. The measuring force of the item to be weighed acts upon inclination pendulum 2 through a coupling member 6 which is connected to a weight lever installation or mechanism, also not illustrated. An indicator 8 is provided on inclination pendulum 2 and is associated with a weight scale 7. In practice, the actual indication of the weight is carried out by known optical techniques.

In addition to the indicator 8, a guide means or plunger 9 is provided at the inclination pendulum 2 and, as illustrated, extends in a generally outwardly direction from the axis of rotation of the inclination pendulum 2 defined by the knife edge. A slide means or member 10 is displaceably mounted in the guide means or plunger 9 at an adjustable distance from the rotational axis of the inclination pendulum 2 in accordance with a base or unit price scale of the item to be weighed and sold. The displaceable horizontally extending structural member 11 is hingedly or pivotally connected to the slide means 10 and is capable of movement in a horizontal direction on a vertically adjustable carriage means 12 by means of rollers 13 and 14. The extent of horizontal movement of the horizontally extending structural member 11 is dependent upon the size of the deflection angle of inclination pendulum 2 and is further dependent upon the distance that the slide means is mounted from the rotational axis of the inclination pendulum. The extent of horizontal movement of structural element 11 is indicative of the total price of the item being weighed and such total price can be read by indicator 15 and price scale 16. Alternatively, the indication of the total price can be performed in known manner utilizing optical projection techniques.

The displacement of the carriage means 12 in the vertical direction takes place by means of a nut 17 provided at the carriage means 12 and by means of a spindle 18 running in the nut 17, spindle 18 being mounted in a vertical fashion in the nonillustrated housing. The spindle can be driven by an electric motor means 19 and pinion 20 via a friction wheel 21 and a bevelgear drive 22 and 23. The extent of vertical displacement of the carriage means 12 is concurrently indicated by a digital indicator means 24 having digit wheels 21' rotatable by a bevelgear drive 25 and 26 as is more clearly illustrated in FIG. 2.

Motor means 19 is mounted on a lever 19' which is supported in the housing normally in a fashion via spring 27 such that the pinion 20 is lifted off or disengaged from the friction wheel 21. When the motor 19 is switched on, such action excites an electromagnet 28, the armature of which is coupled to the end of the lever 19'. Energization of the electromagnet 28 overcomes the force of the spring 27 such that pinion 20 of motor 19 is pushed against the friction wheel 21 and the friction wheel 21 is thus driven as a result thereof.

A notched wheel 31 is provided on an extension 18' of the spindle and has associated with it a pawl 29' of a pawl lever 29. A spring 30 acts upon lever 29 in a fashion so as to normally push the pawl 29' against and into the notched wheel 31. An armature 32' of a stationarily mounted electromagnet 32 is provided at lever 29. Again, when the electric motor is energized or switched in the "on" condition, electromagnet 32 is also excited and serves to lift the pawl 29' out and off of the notched wheel 31.

An indicator 33 is also provided for the carriage means 12 and serves to roughly indicate the basic unit price on a scale 34. The fine adjustment of the vertical positioning of the carriage means and thus of the basic unit price is performed by a manual rotation of a pinion knob 35 which causes rotation of spindle 18 through a bevelgear drive 36 and 37. This drive may be constructed in a known manner as a flywheel drive mechanism.

Two limit switches 39 and 40 are disposed in the path of the carriage means 12 as illustrated and are also electrically disposed in the circuit of motor 19. These limit switches serve the function of eliminating any mechanical overshooting of the spindle 18.

Figure 3:
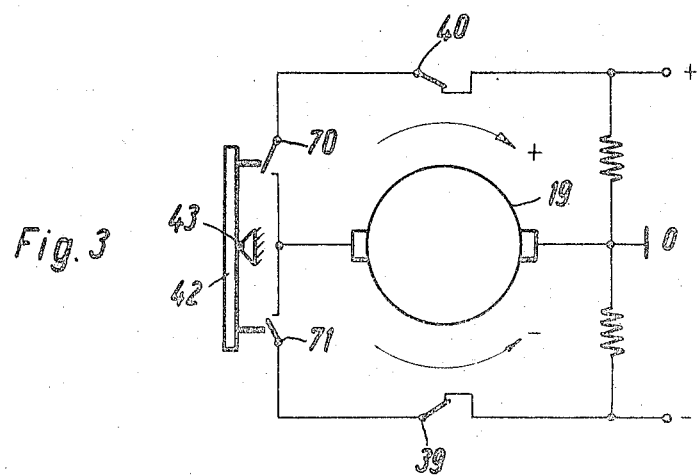
FIG. 3 is a circuit schematic diagram for the electric motor drive.

Referring now to FIG. 3, the circuit arrangement for the motor drive is illustrated and depicts how manual control of the direction of rotation of the drive motor 19 takes place. Switches 70 and 71 for clockwise rotation (+) and for counterclockwise rotation (−), respectively, are constructed in such a manner that one or the other of these switches can be actuated. Thus, it is not possible to switch both of these switches simultaneously and thus motor 19 is selectively constrained to run in one direction at a given time. A rocker 42 is provided in this switching arrangement for ensuring that one or the other of the switches can be actuated, the rocker 42 being pivotally mounted at 43 and being capable of being tipped towards one or the other of the switches 70 and 71 against the force of a nonillustrated spring. Rocker 42 can be provided at the exterior of the scale in a readily accessible manner. In operation, if the rotation of the electric motor is desired to be in the clockwise direction, switch 70 would be closed, and the digital indicator 24 which serves to indicate the basic or unit price set, would run in a forward direction. Alternatively, if the rotation of the electric motor 19 is desired to be in the counterclockwise direction, switch 71 would be closed.

The vertical or height positioning of the carriage means 12 and thus the adjustment of the number which would be shown upon the indicator means or mechanism 24 takes place by application of manual pressure to the rocker 42 and such adjustment as would be effected, would be the coarse adjustment and would take place in a rapid fashion. By rotating a knob or wheel 35, precise or fine adjustment of the vertical displacement of carriage means 12 and of the number illustrated on the indicator means 24 can take place.

Figure 4:
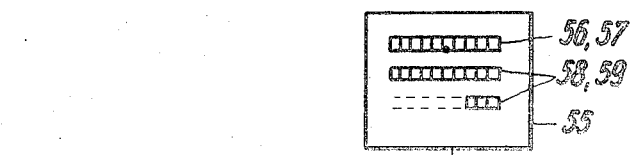
FIG. 4 is a circuit schematic diagram illustrating the interconnection between the electric motor and the control keyboard switch means.

Hereinbelow, the means and mechanism by which the vertical adjustment of carriage 12 is automatically performed through the simple depression of a key on a basic or unit price keyboard is described and such description makes reference in particular to FIGS. 4 through 6, wherein the construction of the basic or unit price keyboard switch means is illustrated. A stationary contact disc 51 is coaxially mounted on a control shaft 50 which comprises an extension of the shaft of motor 19 as illustrated in FIG. 4. Contact disc 51 incorporates a closed contact ring 61 which has a plurality of lamellae 61' associated therewith in an annular pattern. The lamellae ring 61' respectively corresponds to a larger monetary adjustment of the basic price such as the German mark and would be dimensioned, in this instance, with the values 0 to 29 indicative of 0 to 29 German marks. Contact disc 51 further incorporates a smaller closed contact ring 60 which has a plurality of lamallae 60' associated therewith also in annular arrangement. The ring of lamallae 60' in this instance, represents the smaller monetary unit amount such as the German pfennig and is dimensioned with the values 00 to 90 representative of 0 to 90 pfennigs. A mark slider 53 and a pfennig slider 52 are associated with both contact rings, as shown in FIG. 6. Although the description of the contact disc as set forth above and as will take place in more detail hereinbelow refers to German monetary units, it should be expressly understood that the monetary units of any currency could be substituted therefor with appropriate adjustment of the lamellae 60' and 61'.

Sliders 52 and 53 are coupled with the control shaft 50 in a known manner via a Maltese cross or Geneva indexing mechanism 54 in such manner that the mark slider 53 advances by one step after a full rotation of the pfennig slider 52. It is also possible to proceed in a reverse order, namely, to set the contact disc 51 on the control shaft 50 for rotation and to mount the sliders themselves in a stationary fashion.

The lamellae or conducting strips of the contact disc 51 are connected to a keyboard 55 such as depicted in FIG. 4 via a cable, the keyboard 55 comprising 10 keys for each multiple contact 56 and 57, respectively, for the pfennig amounts 0 to 90 and 30 keys for each of the multiple contacts 58, 59 for the mark amounts. The contact rings 60 and 61 are coupled with an amplifier 62 as illustrated in FIGS. 4 and 6. Sliders 52 and 53 as shown in FIG. 6, connect one lamella each with the contact rings 60 and 61.

A reversing switch 63 is disposed at the input side of amplifier 62, the reversing switch ensuring that the contact ring 61 for the mark adjustment is first connected with the amplifier 62. After this adjustment is completed, amplifier 62 would cause this reversing switch 63 to reverse and thus connect the pfennig adjustment conductor with amplifier 62. After the pfennig adjustment is terminated, the reversing switch 63 would once again reverse.

The adjustment of sliders 52 and 53 and thus of the drive of the spindle 50 and the adjustment of the basic unit price by vertical displacement of the carriage means 12 takes place as follows:

Initially, it is assumed that adjustment is to be made for the basic unit price 1.00 marks per kilogram. On the keyboard switch means 55, the key 56 is depressed for a pfennig value 00 and key 59 is depressed for the mark value 1. The multiple contacts 56 and 59 as depicted in FIG. 6 associated with the key will now assume the position shown by the dotted lines. Thus, lamella 1 in the mark ring of lamellae is rendered electrical potential free - whereas lamellae 2 through 29 are charged with the negative (−) potential and lamella 0 is charged with a positive (+) potential. Thus, if slider 53 rests on a lamella in the group 2 through 29, amplifier 62 receives a negative (−) potential and the motor 19 would begin to run in the direction of rotation wherein it moves the control shaft 50 towards the lower basic unit prices.

On the other hand, if the slider 53 rests on lamella 0, as depicted in the drawing, or under the lamella, the amplifier 62 would receive a positive (+) signal and motor 19 would drive the control shaft 50 toward the higher basic unit prices. Only when slider 53 rests on lamella 1 will the input to the amplifier receive no potential at all and thus cause the motor 19 to stand still. The mark basic unit price is set at the control shaft 50. Now, reversing switch 60 switches to the pfennig lamellae. The control means repeats itself accordingly. If the lamellae 10 through 90 give a positive (+) potential to the amplifier, the electric motor 19 would rotate toward lower basic prices. One of the 0 lamellae (without contacts) results in a positive (+) potential and allows the motor to rotate in the clockwise direction. It is only on lamella 0 as set by the contacts where the slider 52 would see no potential such that the motor would stand still. At this point, both values of the basic unit price have been set.

The double lamellae in the pfennig adjustment function as follows:

If the left-hand side 0 lamella were not present, lamella 90 would be at this location with a negative (−) potential. Now, if the slider 52 comes from the higher pfennig amounts, for example, from 50, toward the lower amounts and if the slider would travel beyond the potential-free lamella 0, the amplifier would only receive a negative (−) potential at all times and would serve to rotate only in one direction. By virtue of the fact that there is present one 0 lamella having a positive (+) potential, amplifier 62 will immediately receive this positive (+) potential as the slider travels over the potential-free 0 lamella and the motor will reverse its rotational direction. Since the 0 is divided in this fashion, the other lamellae must of course also be divided for reasons of symmetry.

For the same reason, a constant positive (+) potential conducting lamella is also provided under the 0 lamella of the mark lamellae and a continuously wired negative (−) potential conducting lamella is also provided above the last lamella 29. Both additional lamellae cause reversal of the direction of the motor during an overshoot.

The width of the sliders 52 and 53 is advantageously as wide as the lamellae pertaining thereto. As a result thereof, a very high adjustment accuracy can be obtained. If the width were the same, and if the displacement were small, the slider would immediately receive potential from neighboring lamellae, the potential causing the slider to reverse its direction. If the width of the slider were small, the possible lateral displacement and thus the possible rotation of the control shaft 50 would be larger. That is to say, spindle 18 and thus the carriage means 12 in the indicator means 24 would not be in the exact or ideal position for the set basic unit price.

A further alignment to achieve precise adjustment of the position of the carriage means is achieved by the provision of the notched wheel 31 and the pawl 29. When the current to motor 19 is interrupted, electromagnet 32 disengages the pawl 29 which then engages the notched wheel 31 under action of the spring 30. By means of the pawl and ratchet action, the notched wheel and thus the spindle 18 would be aligned.

An advantageous feature of the instant invention resides in the fact that motor 19 is simultaneously lifted off or disengaged from the drive wheel 21 by means of a spring 27 as a result of deenergization of magnet 28. Consequently, control shaft 50 would be relieved of the effects of motor friction and of the magnetic pole aligning characteristic of DC motors. Likewise, the rotational momentum of the motor would have no effect upon the precise adjustment of the entire displacing mechanism.

Figure 7:
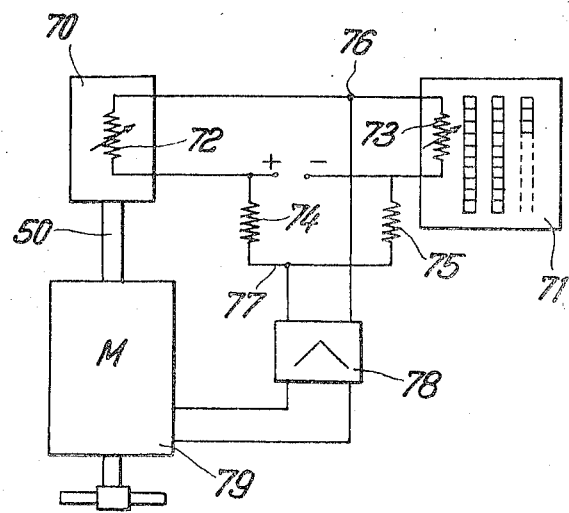
FIG. 7 depicts an alternative embodiment of the instant invention.

An alternative mode of contactless setting or adjustment is depicted diagrammatically in FIG. 7 and is based on the technique of comparing resistances, i.e., a setting by comparing two resistances. A variable resistance imparting element or means 70 preferably comprising an adjustable resistor 72 is disposed on control shaft 50. The resistance value of this resistance imparting means 70 is proportionate to its angle of rotation and hence proportionate to the displacement of control shaft 50. If now, in reverse order, a resistance value proportionate to the base price is generated on keyboard 71 for each mark and pfennig amount by depressing the respective keys, then it is possible, by means of a simple bridge connection comprising adjustable resistances 72 and 73 and stationary resistances 74 and 75 (wheatstone bridge) in whose diagonal branch 76, 77 is disposed motor 79 via a suitable amplifier 78, to drive the control shaft such that both resistance values 72 and 73 are equally as large. The arrangement is such that when resistances 72 and 73 are equally as large, the adjustment of the control shaft 50 corresponds to the base price depressed on keyboard 71.

It should now be apparent that the objects set forth at the outset of this specification have now been successfully achieved.

We claim:

1. An automatic price calculation scale comprising: an inclination pendulum means deflectable through an angle about a rotational axis in dependence on the weight to be measured; an elongated guide means attached to said pendulum means and extending in a direction generally outwardly from the rotational axis thereof; slide means displaceably mounted in said guide means at an adjustable distance from the rotational axis of said pendulum means in accordance with a base price scale; a displaceable, horizontally extending member pivotally connected to said slide means whereby angular deflection of said pendulum means brings about horizontal movement of said horizontally extending member, the extent of horizontal movement being indicative of the total price and being a function of the angular deflection of said pendulum means and the distance that said slide means is mounted from the rotational axis of said pendulum means; carriage means for supporting said horizontally extending member; drive means for vertically displacing said carriage means and thereby vertically displacing said horizontally extending member and said slide means so as to adjust the distance that said slide means is mounted from the rotational axis of said pendulum means in accordance with the base price scale, said drive means comprising a spindle drive having a vertically mounted rotatable spindle and motor means for rotating said spindle, said motor means selectively running in a clockwise or counterclockwise direction.

2. An automatic price calculation scale as defined in claim 1 further including a digital indicator means for indicating the base price scale, said digital indicator means being coupled with said spindle means and being operated thereby.

3. An automatic price calculation scale as defined in claim 2, further including an indicator means coupled with said carriage means for indicating the vertical displacement thereof.

4. An automatic price calculation scale as defined in claim 1 further including a friction drive means disposed between said motor means and said vertically mounted spindle, said friction drive means including a drive wheel associated with said motor means and a driven wheel associated with said spindle; and means associated with said friction drive means for disengaging said driven wheel from said drive wheel.

5. An automatic price calculation scale as defined in claim 4 further including a first electromagnet means associated with said friction drive means, said electromagnet means maintaining said friction drive means in an engaged condition as long as said motor means is under current and thus is being driven.

6. An automatic price calculation scale as defined in claim 5 further including a notched wheel associated with said spindle means and a pawl lever having a pawl normally engaging said notches of said notched wheel, and second electromagnet means for lifting said pawl lever as long as said motor means is under current and thus is being driven.

7. An automatic price calculation scale as defined in claim 4, further including stationary limit switch means associated with said carriage means and operative by said carriage means when said carriage means reaches an end limit of vertical displacement, said limit switch means turning off said motor means in both end limit positions of said carriage means.

8. An automatic price calculation scale as defined in claim 4 further including rocker switch means for switching on said motor means and said first and second electromagnet means.

9. An automatic price calculation scale as defined in claim 8 further including a keyboard switch means having a plurality of keys thereon, said plurality of keys being operative to set the base price scale, and means coupling said motor and said first and second electromagnet means to said keyboard switch means in such manner that said carriage means assumes a vertical position corresponding to the base price determined by said keys of said keyboard switch means.

10. An automatic price calculation scale as defined in claim 9, further including adjustable resistance means and a control shaft means, said adjustable resistance means being disposed on and adjusted by said control shaft means, said motor means driving said control shaft means; said adjustable resistance means comprising an adjustable resistor and being disposed in a bridge circuit with an additional adjustable resistor, said additional adjustable resistor being adjustable by said keyboard switch means; and first and second additional resistors disposed in said bridge circuit, said motor means being connected in a diagonal branch of said bridge circuit between said adjustable resistors and said additional resistors.

11. An automatic price calculation scale as defined in claim 9, further including a contact disc means and a control shaft means, said contact disc means being mounted on said control shaft means, said motor means driving said control shaft means; said contact disc means comprising a closed contact ring and a ring of conductive lamellae associated with said contact ring, stationary slider means for connecting said lamellae with said contact ring, said motor means operating in response to selective connections of individual lamellae with said stationary slider means; and wherein each of said lamellae can be selectively electrically neutralized by actuation of a key of said keyboard switch means, such that said motor means is no longer under current when said stationary slider means is in a position corresponding to a neutralized lamella.

12. An automatic price calculation scale as defined in claim 11, wherein said slider means are mounted on said control shaft and wherein said contact disc means is stationarily mounted.

13. An automatic price calculation scale as defined in claim 11 further including a second closed contact ring on said contact disc means and a second ring of lamellae associated with said second contact ring; an alternating switch means for successively switching control of said motor means alternatively between both contact rings and associated lamellae.

14. An automatic price calculation scale as defined in claim 13, wherein each respective ring of lamellae is associated with different monetary units of the base price.

15. An automatic price calculation scale comprising: an inclination pendulum means deflectable through an angle about a rotational axis in dependence on the weight to be measured; and elongated guide means attached to said pendulum means and extending in a direction generally outwardly from the rotational axis thereof; slide means displaceably mounted in said guide means at an adjustable distance from the rotational axis of said pendulum means in accordance with a base price scale; a displaceable horizontally extending member pivotally connected to said slide means, whereby angular deflection of said pendulum means brings about horizontal movement of said horizontally extending member, the extent of horizontal movement being indicative of the total price and being a function of the angular deflection of said pendulum means and the distance that said slide means is mounted from the rotational axis of said pendulum means; carriage means for supporting said horizontally extending member; drive means for vertically displacing said carriage means and thereby vertically displacing said horizontally extending member and said slide means to adjust the distance that said slide means is mounted from the rotational axis of said pendulum means in accordance with the base price scale, said drive means comprising a spindle drive having a vertically mounted rotatable spindle, and means comprising a manually operable flywheel drive for selectively rotating said spindle means in a clockwise or counterclockwise direction.

16. An automatic price calculation scale as defined in claim 15 further including a digital indicator means for indicating the base price scale, said digital indicator means being coupled with said spindle means and being operated thereby.

17. An automatic price calculation scale as defined in claim 16 further including an indicator means coupled with said carriage means for indicating the vertical displacement thereof.